United States Patent
Kuri

(10) Patent No.: US 12,086,976 B2
(45) Date of Patent: Sep. 10, 2024

(54) INSPECTION METHOD AND INSPECTION DEVICE

(71) Applicant: Seiko Epson Corporation, Tokyo (JP)

(72) Inventor: Ryohei Kuri, Minowa (JP)

(73) Assignee: SEIKO EPSON CORPORATION (JP)

( * ) Notice: Subject to any disclaimer, the term of this patent is extended or adjusted under 35 U.S.C. 154(b) by 445 days.

(21) Appl. No.: 17/560,362

(22) Filed: Dec. 23, 2021

(65) Prior Publication Data
US 2022/0207685 A1 Jun. 30, 2022

(30) Foreign Application Priority Data
Dec. 25, 2020 (JP) .................................. 2020-216142

(51) Int. Cl.
*G01J 3/46* (2006.01)
*G01J 3/50* (2006.01)
(Continued)

(52) U.S. Cl.
CPC .............. *G06T 7/001* (2013.01); *G01J 3/463* (2013.01); *G01J 3/50* (2013.01); *G01N 21/27* (2013.01);
(Continued)

(58) Field of Classification Search
CPC ... G06T 7/001; G06T 7/11; G06T 7/90; G06T 2207/10024; G06T 2207/20021;
(Continued)

(56) References Cited

U.S. PATENT DOCUMENTS

| 5,668,890 | A | * | 9/1997 | Winkelman | ......... | H04N 1/4074 |
| | | | | | | 358/521 |
| 11,694,366 | B2 | * | 7/2023 | Arai | ...................... | G06T 11/206 |
| | | | | | | 345/589 |
| 2015/0278629 | A1 | * | 10/2015 | Vanderhoff | ........... | G06T 7/0002 |
| | | | | | | 382/162 |

FOREIGN PATENT DOCUMENTS

| JP | 2010-183471 A | 8/2010 |
| JP | 2017-194421 A | 10/2017 |

* cited by examiner

*Primary Examiner* — Roy M Punnoose
(74) *Attorney, Agent, or Firm* — Harness, Dickey & Pierce, P.L.C.

(57) ABSTRACT

An inspection method includes: a first acquisition step of acquiring information in which information on a color difference with respect to a reference color is assigned to each of a plurality of first divided regions into which an reference image is divided; a second acquisition step of acquiring information in which information on a color difference with respect to the reference color is assigned to each of a plurality of second divided regions into which a captured image is divided; a first comparison step of comparing the information on the color difference of each of the first divided regions with the information on the color difference of each of the corresponding second divided regions; and a second comparison step of comparing the information on the color difference of each of the first divided regions with the information on the color difference of each of the second divided regions in a combination different from the combination in which the comparison is performed in the first comparison step, and whether reference image data and the captured image data match each other is determined based on a first comparison result obtained in the first comparison step and a second comparison result obtained in the second comparison step.

10 Claims, 10 Drawing Sheets

(51) Int. Cl.
  *G01N 21/27* (2006.01)
  *G06T 7/00* (2017.01)
  *G06T 7/11* (2017.01)
  *G06T 7/90* (2017.01)
(52) U.S. Cl.
  CPC .................. *G06T 7/11* (2017.01); *G06T 7/90* (2017.01); *G06T 2207/10024* (2013.01); *G06T 2207/20021* (2013.01); *G06T 2207/30108* (2013.01)
(58) Field of Classification Search
  CPC ... G06T 2207/30108; G01J 3/463; G01J 3/50; G01N 21/27; G01N 21/255; G01N 21/8806; G01N 21/8851; G01N 21/95607; G01N 2021/8887
  See application file for complete search history.

INSPECTION METHOD AND INSPECTION DEVICE

The present application is based on, and claims priority from JP Application Serial Number 2020-216142, filed Dec. 25, 2020, the disclosure of which is hereby incorporated by reference herein in its entirety.

BACKGROUND

1. Technical Field

The present disclosure relates to an inspection method and an inspection device.

2. Related Art

For example, there is known an identification device that determines whether a reference image serving as a reference for authenticity determination and a comparison image to be compared match each other in a printed object. For example, in a printed object image identification device described in JP-A-2010-183471 (PTL 1), an overall integration processing, a block integration processing, a block differentiation processing, and a determination stage are sequentially executed.

The overall integration processing is a processing of calculating an overall integrated value by adding pixel values of pixels of an overall image to be compared for each color component. The block integration processing is a processing in which the overall image is divided into a plurality of blocks, and a block integration value is calculated for each of the blocks obtained by the division by adding pixel values of pixels in a block for each color component. The block differentiation processing is a processing of calculating a block differential value for each of the blocks obtained by the division by calculating a difference between adjacent pixels in a block and calculating an average value of the difference. The determination stage is a processing of determining whether the reference image and the comparison image match each other by comparing an overall integrated value, a block integration value, and a block differential value of the reference image with an overall integrated value, a block integration value, and a block differential value of a subject image, respectively.

However, in the identification device described in PTL 1, it is assumed that a position of a measurement target is fixed when the comparison image is captured. Therefore, when an orientation of the measurement target is different from an orientation of the measurement target in the reference image, it may be determined that the comparison image does not match the reference image in a case where it is to be determined that the comparison image matches the reference image.

SUMMARY

An inspection method according to the disclosure is an inspection method of inspecting whether reference image data of a reference image and captured image data of a captured image match each other, the inspection method includes: a first acquisition step of acquiring information in which information on a color difference with respect to a reference color is assigned to each of a plurality of first divided regions into which the reference image is divided; a second acquisition step of acquiring information in which information on a color difference with respect to the reference color is assigned to each of a plurality of second divided regions into which the captured image is divided; a first comparison step of comparing the information on the color difference of each of the first divided regions with the information on the color difference of each of the corresponding second divided regions; and a second comparison step of comparing the information on the color difference of each of the first divided regions with the information on the color difference of each of the second divided regions in a combination different from the combination in which the comparison is performed in the first comparison step, and whether the reference image data and the captured image data match each other is determined based on a first comparison result obtained in the first comparison step and a second comparison result obtained in the second comparison step.

An inspection device according to the disclosure is an inspection device including a control unit configured to inspect whether reference image data of a reference image and captured image data of a captured image match each other, the control unit is configured to execute: a first acquisition step of acquiring information in which information on a color difference with respect to a reference color is assigned to each of a plurality of first divided regions into which the reference image is divided, a second acquisition step of acquiring information in which information on a color difference with respect to the reference color is assigned to each of a plurality of second divided regions into which the captured image is divided, a first comparison step of comparing the information on the color difference of each of the first divided regions with the information on the color difference of each of the corresponding second divided regions, and a second comparison step of comparing the information on the color difference of each of the first divided regions with the information on the color difference of each of the second divided regions in a combination different from the combination in which the comparison is performed in the first comparison step, and whether the reference image data and the captured image data match each other is determined based on a first comparison result obtained in the first comparison step and a second comparison result obtained in the second comparison step.

DESCRIPTION OF EXEMPLARY EMBODIMENTS

First Embodiment

Figure 1:
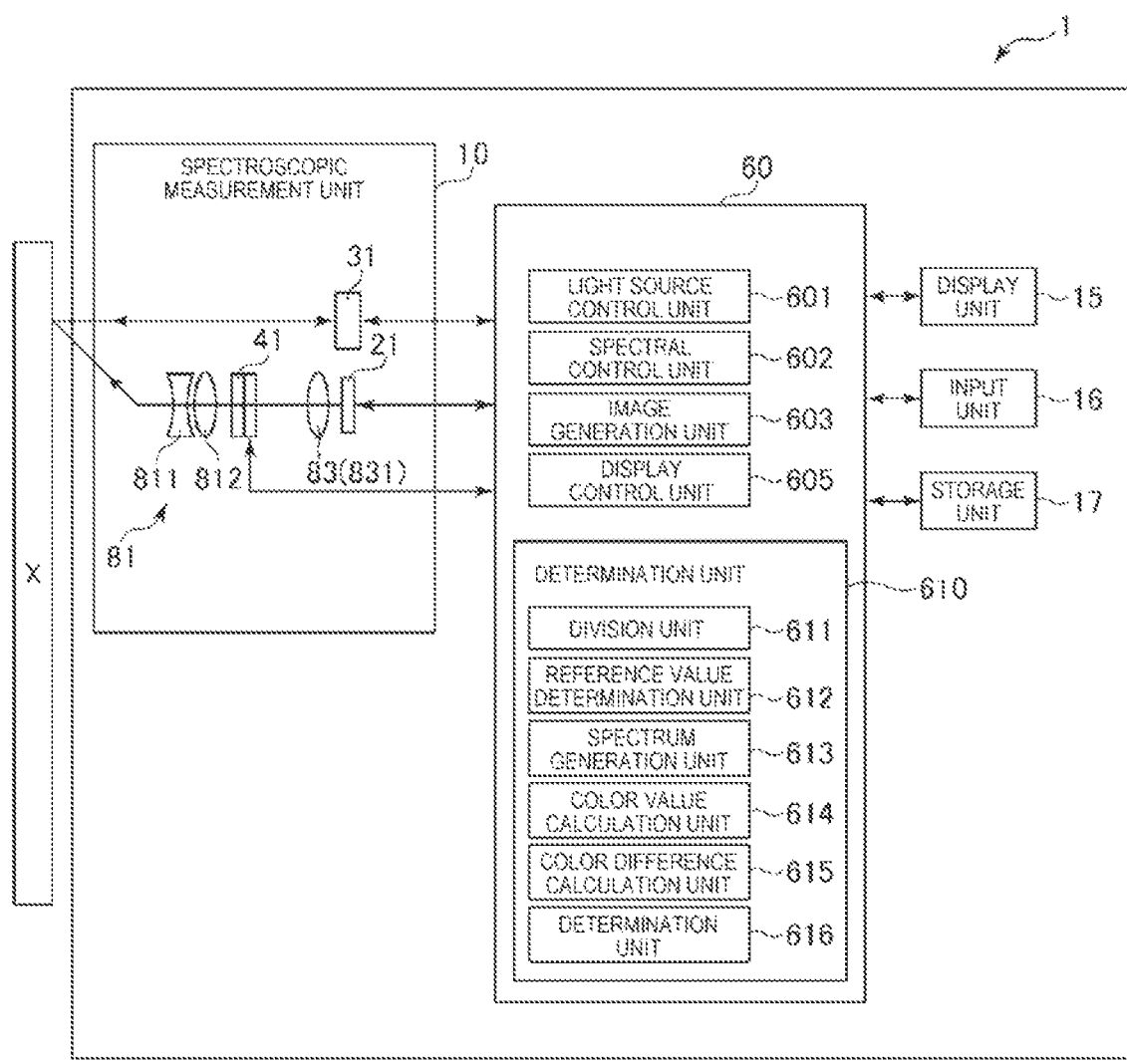
FIG. 1 is a functional block diagram of an inspection device according to a first embodiment of the disclosure.
Figure 2:
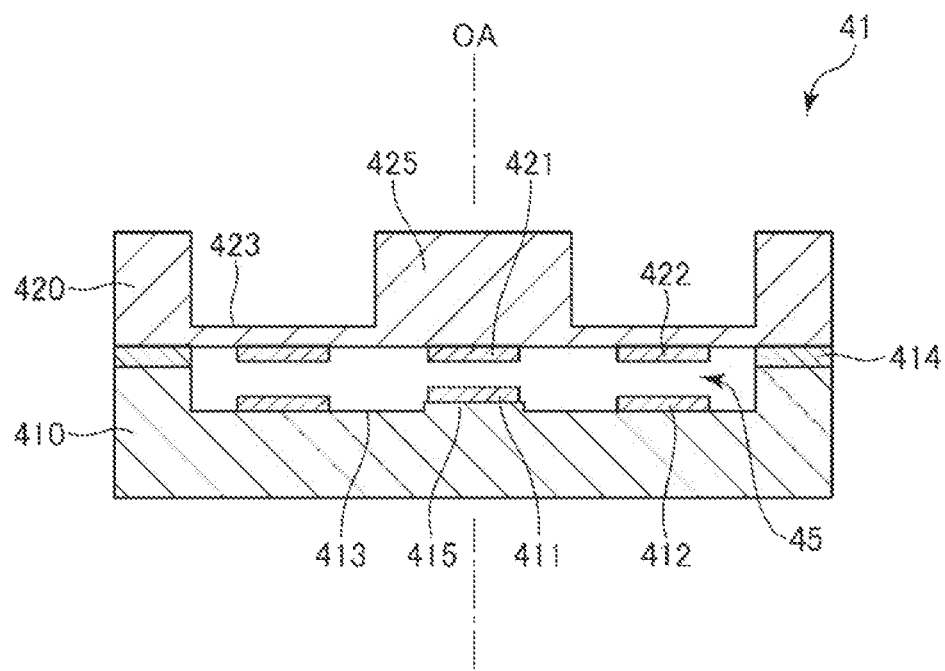
FIG. 2 is a cross-sectional view of a spectroscopic unit shown in FIG. 1.
Figure 3:
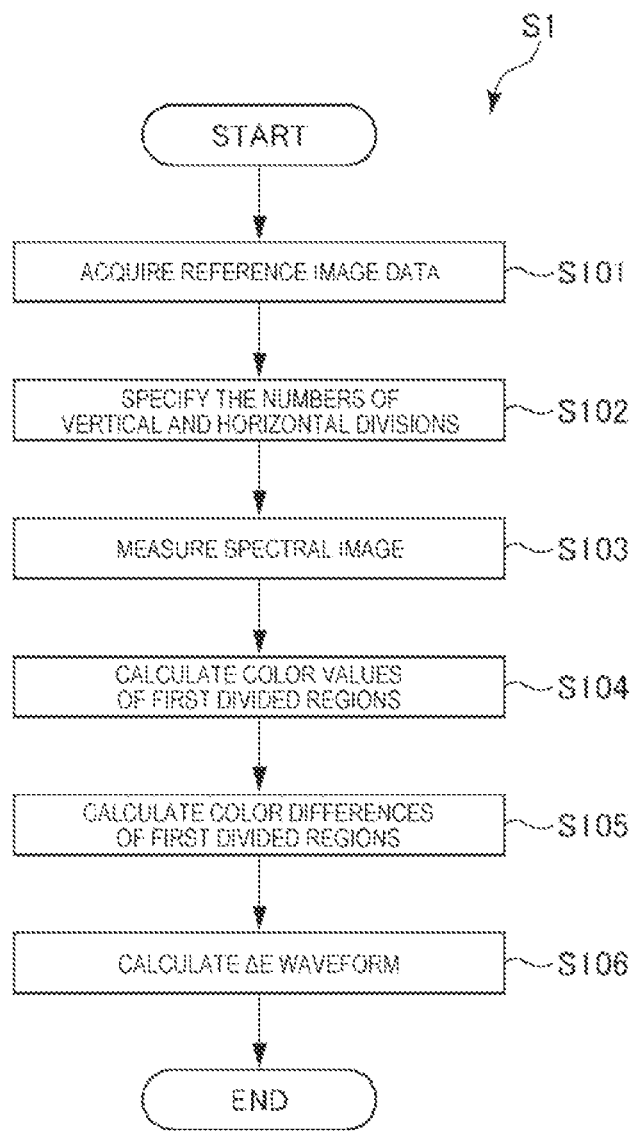
FIG. 3 is a flowchart illustrating an example of an inspection method according to the first embodiment of the disclosure.
Figure 4:
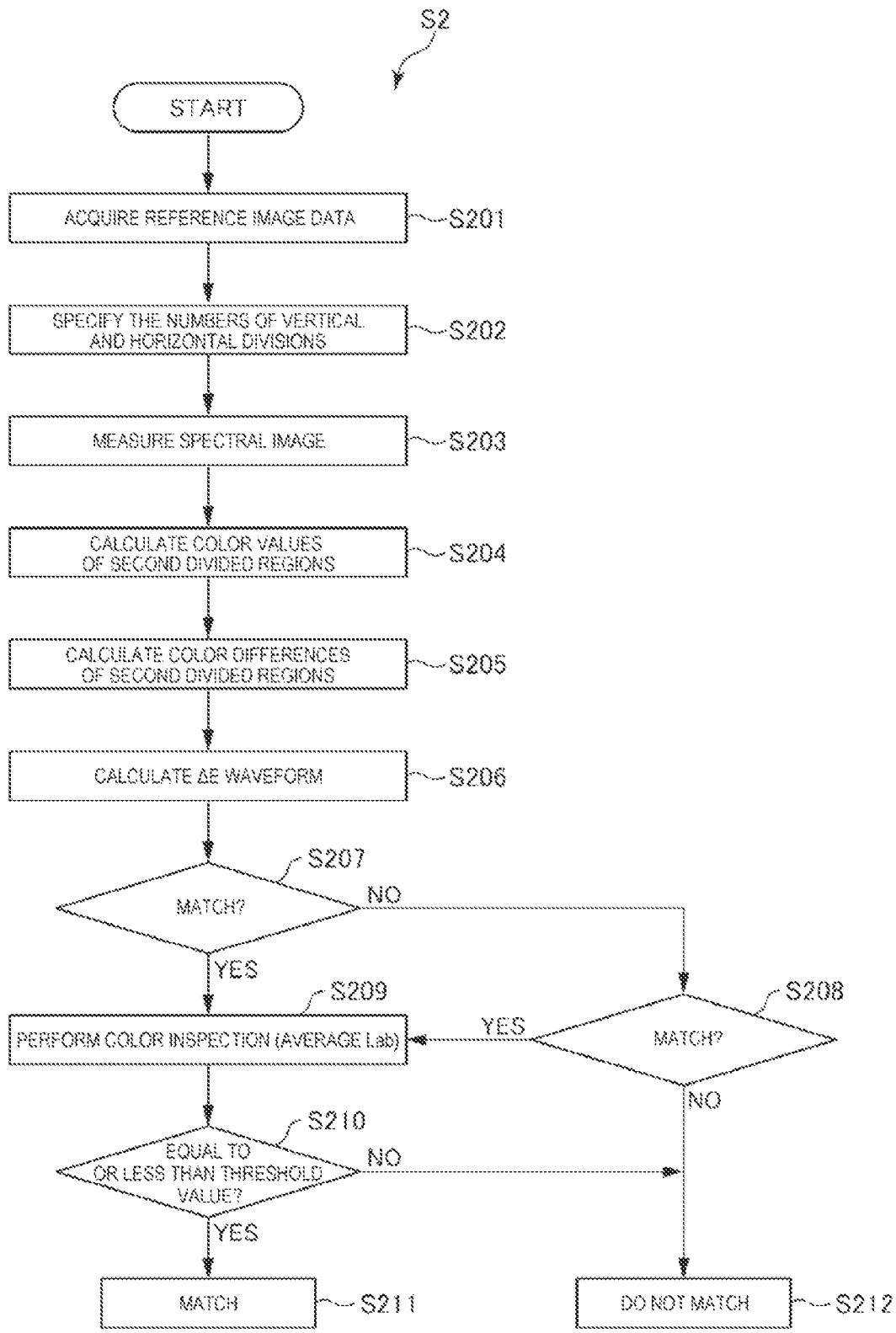
FIG. 4 is a flowchart illustrating the example of the inspection method according to the first embodiment of the disclosure.
Figure 5:
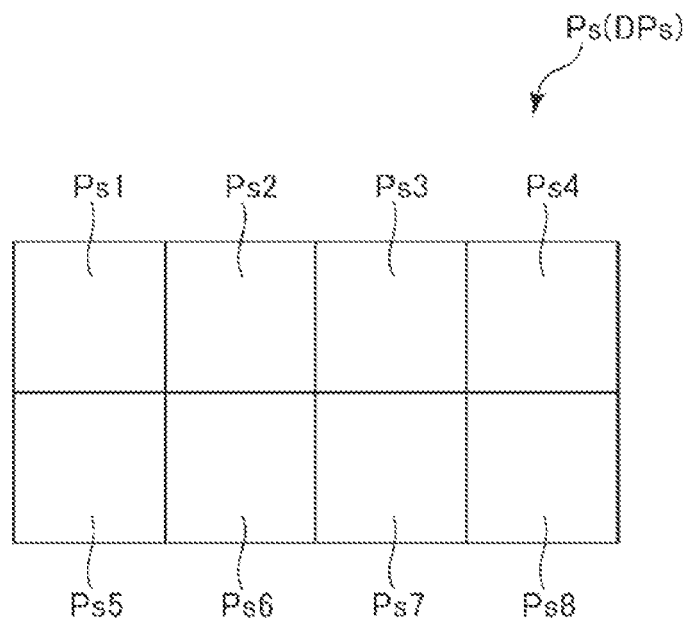
FIG. 5 is a diagram showing a state in which first divided regions are set in a reference image.
Figure 6:
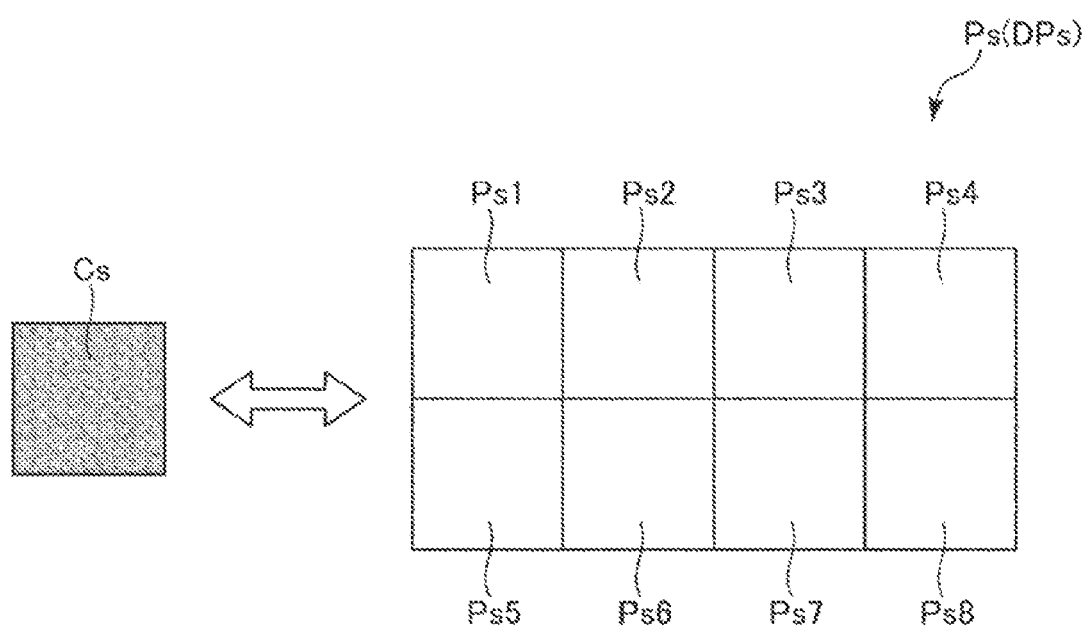
FIG. 6 is a diagram showing a state in which each first divided region is compared with a reference color.
Figure 7:
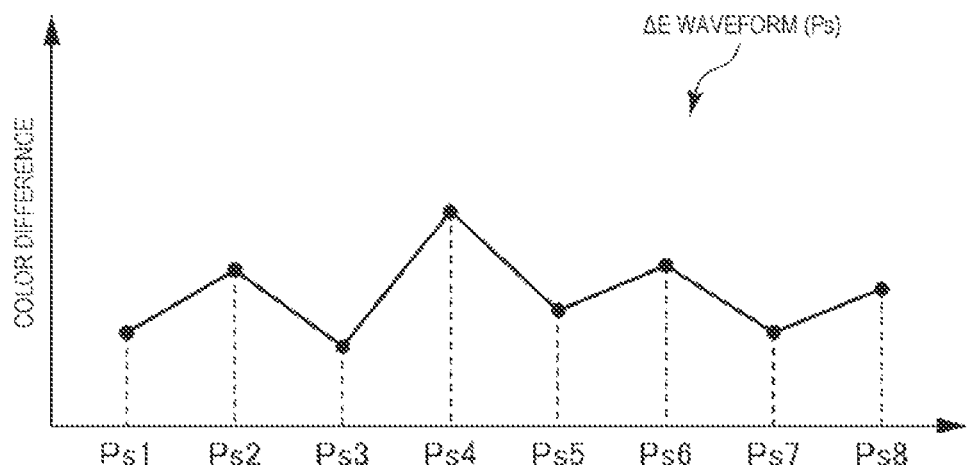
FIG. 7 is a graph showing a waveform indicating a color difference of each first divided region.
Figure 8:
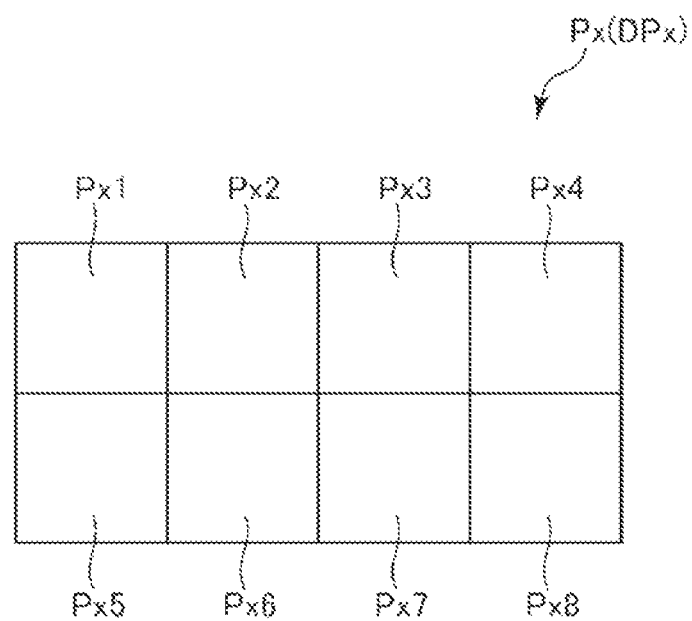
FIG. 8 is a diagram showing a state in which second divided regions are set in a captured image.
Figure 9:
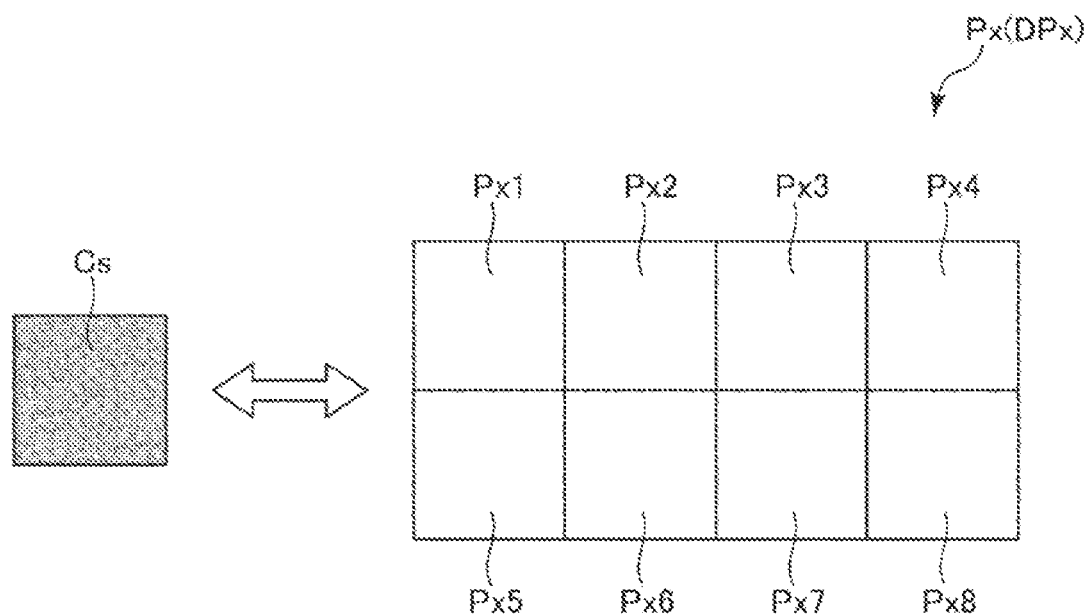
FIG. 9 is a diagram showing a state in which each second divided region is compared with the reference color.
Figure 10:
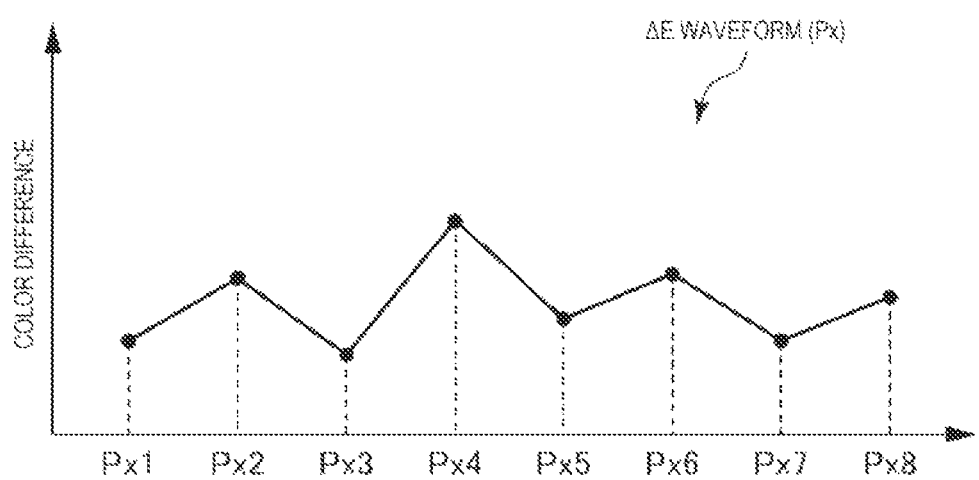
FIG. 10 is a graph showing a waveform indicating a color difference of each second divided region.
Figure 11:
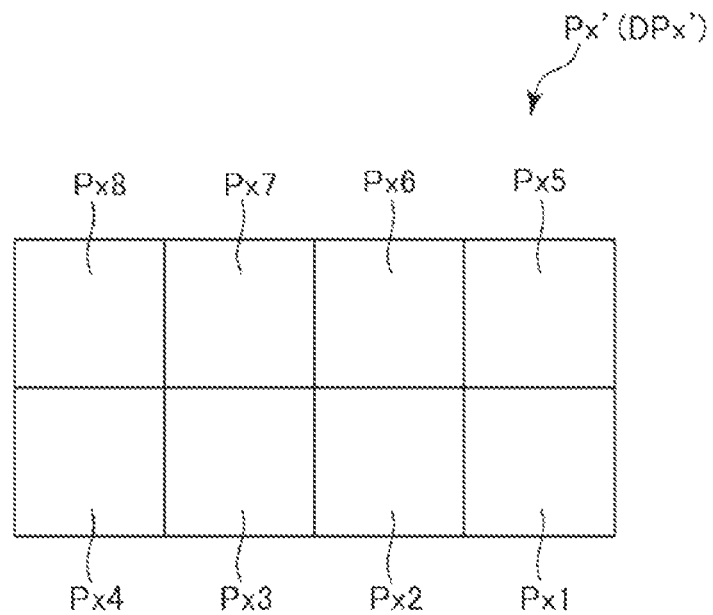
FIG. 11 is a diagram showing a state in which the second divided regions are set in the captured image in a rotated state.
Figure 12:
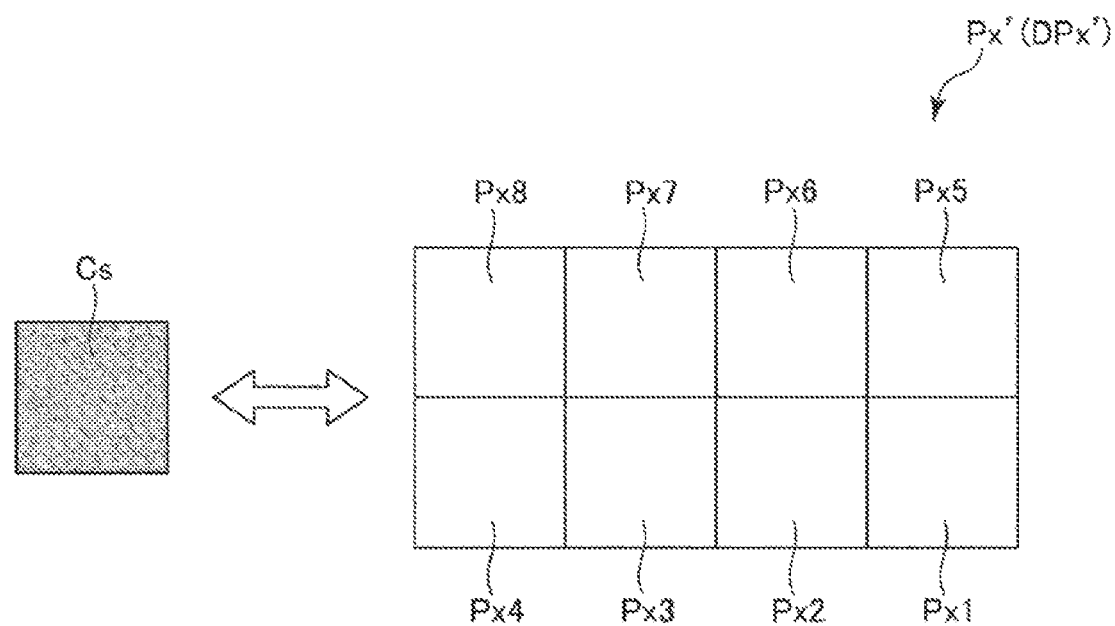
FIG. 12 is a diagram showing a state in which each second divided region is compared with the reference color.
Figure 13:
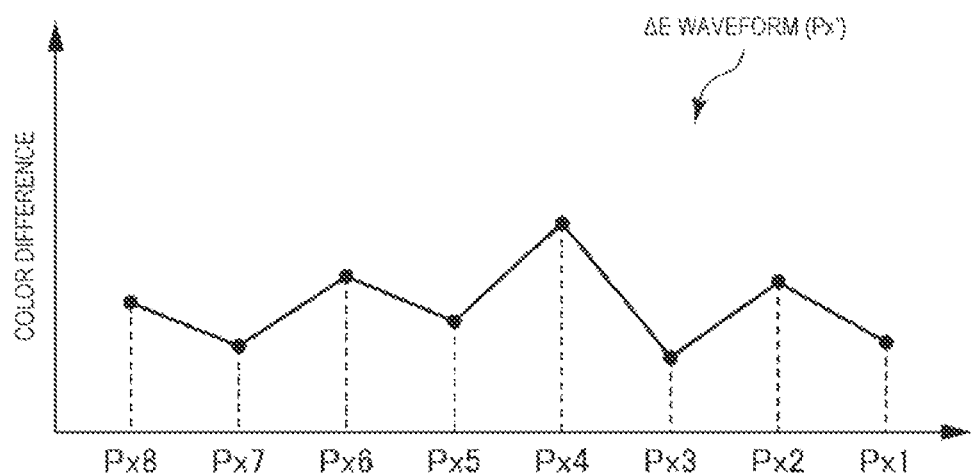
FIG. 13 is a graph showing a waveform indicating a color difference of each second divided region.

FIG. 1 is a functional block diagram of an inspection device according to a first embodiment of the disclosure. FIG. 2 is a cross-sectional view of a spectroscopic unit shown in FIG. 1. FIG. 3 is a flowchart illustrating an example of an inspection method according to the first embodiment of the disclosure. FIG. 4 is a flowchart illustrating the example of the inspection method according to the first embodiment of the disclosure. FIG. 5 is a diagram showing a state in which first divided regions are set in a reference image. FIG. 6 is a diagram showing a state in which each first divided region is compared with a reference color. FIG. 7 is a graph showing a waveform indicating a color difference of each first divided region. FIG. 8 is a diagram showing a state in which second divided regions are set in a captured image. FIG. 9 is a diagram showing a state in which each second divided region is compared with the reference color. FIG. 10 is a graph showing a waveform indicating a color difference of each second divided region. FIG. 11 is a diagram showing a state in which the second divided regions are set in the captured image in a rotated state. FIG. 12 is a diagram showing a state in which each second divided region is compared with the reference color. FIG. 13 is a graph showing a waveform indicating a color difference of each second divided region.

Hereinafter, an inspection method and an inspection device according to the disclosure will be described in detail based on preferred embodiments shown in accompanying drawings.

1. Inspection Device

An inspection device 1 shown in FIG. 1 is a device that executes an inspection method according to the disclosure, and is a device that inspects whether a captured image Px, which is an image of an imaging target X, and a reference image Ps match each other. Specifically, the inspection device 1 is a device that disperses reflected light reflected by the imaging target X, generates a spectral image based on light of a plurality of wavelengths, and a spectrum obtained from the spectral image, and performs the inspection based on these pieces of information. The imaging target X is not particularly limited, and examples thereof include a pattern printed on paper, and a fabric or tile having a pattern.

The inspection device 1 includes a spectroscopic measurement unit 10, a control unit 60, a display unit 15, an input unit 16, and a storage unit 17. Hereinafter, each unit will be sequentially described.

1.1. Spectroscopic Measurement Unit

The spectroscopic measurement unit 10 includes a light source 31, an imaging element 21, and a spectroscopic unit 41.

The light source 31 is a device that emits light to the imaging target X. The light emitted to and reflected by the imaging target X is incident on the imaging element 21 as reflected light passing through the spectroscopic unit 41 described later. The light source 31 may be provided separately from the inspection device 1.

Examples of the light source 31 include a light emitting diode (LED) element, an organic electro-luminescence (EL) element, a xenon lamp, and a halogen lamp. As the light source 31, a light source having a light intensity in an entire wavelength region that can be dispersed by the spectroscopic unit 41 described later is preferably used, and specifically, a light source capable of emitting white light having a light intensity in an entire visible light region is preferably used. The light source 31 may be a device capable of emitting light in a wavelength range other than white light, for example, light other than visible light such as infrared light.

The imaging element 21 is a device that forms an image by reflected light reflected by the imaging target X. Examples of the imaging element 21 include a charge coupled device (CCD), a complementary metal oxide semiconductor (CMOS), and the like.

The spectroscopic unit 41 is an optical element having a function of selectively emitting (transmitting) light in a specific wavelength region from incident light. The light emitted from the spectroscopic unit 41 is incident on the imaging element 21. The spectroscopic unit 41 shown in FIG. 2 is a wavelength-variable interference filter capable of changing a wavelength region of emitted light, that is, a specific wavelength region.

Examples of the wavelength-variable interference filter include a wavelength-variable Fabry-Perot etalon filter, an acousto-optic tunable filter (AOTF), a linear variable filter (LVF), and a liquid crystal tunable filter (LCTF). Among these, as the wavelength-variable interference filter, a wavelength-variable Fabry-Perot etalon filter is preferably used. In the wavelength-variable Fabry-Perot etalon filter, a size of a gap between two filters (mirrors) can be adjusted by an electrostatic actuator 45 or the like described later. As a result, the specific wavelength region can be changed.

The Fabry-Perot etalon filter extracts light in a specific wavelength region by using multi-interference of the two filters. Since each filter can be made thin, the spectroscopic unit 41 to which the Fabry-Perot etalon filter is applied can be made sufficiently thin. Specifically, a thickness of the spectroscopic unit 41 can be set to 2.0 mm or less. Therefore, it is possible to reduce a size of the spectroscopic unit 41 and thus a size of the inspection device 1.

FIG. 2 shows the spectroscopic unit 41 to which the wavelength-variable Fabry-Perot etalon filter is applied as the wavelength-variable interference filter.

The spectroscopic unit 41 shown in FIG. 2 is a plate-shaped member having an optical axis OA extending in an upper-down direction in FIG. 2 and extending in a direction intersecting the optical axis OA. The spectroscopic unit 41 includes a fixed substrate 410, a movable substrate 420, a fixed reflection film 411, a movable reflection film 421, a fixed electrode 412, a movable electrode 422, and a bonding film 414. The fixed substrate 410 and the movable substrate 420 are integrally bonded to each other via the bonding film 414 in a state in which the fixed substrate 410 and the movable substrate 420 are stacked on each other.

The fixed substrate 410 includes a reflection film installation portion 415 located in a central portion and a groove 413 surrounding the reflection film installation portion 415 in a plan view from a position on the optical axis OA. In the fixed substrate 410, a length of a part corresponding to the reflection film installation portion 415 along the optical axis OA, that is, a thickness of the part is larger than that of a part corresponding to the groove 413. The fixed reflection film 411 is provided on a surface of the reflection film installation portion 415 on a movable substrate 420 side. The fixed reflection film 411 functions as a fixed optical mirror which is one of optical elements of the Fabry-Perot etalon filter.

The movable substrate 420 includes a reflection film installation portion 425 positioned in a central portion and a groove 423 surrounding the reflection film installation portion 425 in a plan view from a position on the optical axis OA. In the movable substrate 420, a length of a part corresponding to the reflection film installation portion 425 along the optical axis OA, that is, a thickness of the part is larger than that of a part corresponding to the groove 423. The movable reflection film 421 is provided on a surface of the reflection film installation portion 425 on a fixed substrate 410 side. The movable reflection film 421 also functions as a movable optical mirror which is one of the optical elements of the Fabry-Perot etalon filter.

The fixed electrode 412 is provided on a surface of the groove 413 of the fixed substrate 410 on the movable substrate 420 side. The movable electrode 422 is provided on a surface of the groove 423 of the movable substrate 420 on the fixed substrate 410 side. When a voltage is applied between the fixed electrode 412 and the movable electrode 422, an electrostatic attractive force is generated, and the size of the gap between the fixed reflection film 411 and the movable reflection film 421 is adjusted. Accordingly, the fixed electrode 412 and the movable electrode 422 constitute the electrostatic actuator 45. Since the movable electrode 422 is provided at a position corresponding to the groove 423, it is possible to increase a displacement amount of the movable reflection film 421 when the electrostatic attractive force is generated.

The thickness of the fixed substrate 410 and the thickness of the movable substrate 420 are both preferably about 0.1 mm or more and 1.0 mm or less. With such a thickness, the thickness of the entire spectroscopic unit 41 can be controlled to 2.0 mm or less. Accordingly, it is possible to reduce a size of the spectroscopic measurement unit 10.

Here, the fixed reflection film 411 and the movable reflection film 421 are disposed to face each other with a gap therebetween. Further, the fixed electrode 412 and the movable electrode 422 are also disposed to face each other with a gap therebetween. As described above, the fixed electrode 412 and the movable electrode 422 constitute the electrostatic actuator 45 that adjusts the size of the gap between the fixed reflection film 411 and the movable reflection film 421. Specifically, when a voltage is applied between the fixed electrode 412 and the movable electrode 422, an electrostatic attractive force is generated, and the movable substrate 420 is bent. As a result, the size of the gap between the fixed reflection film 411 and the movable reflection film 421, that is, the distance between fixed reflection film 411 and the movable reflection film 421 can be changed. By appropriately setting the size of the gap, it is possible to select the wavelength region of the light transmitted though the spectroscopic unit 41 along the optical axis OA. That is, the specific wavelength region can be changed. By changing configurations of the fixed reflection film 411 and the movable reflection film 421, it is also possible to control a half-value width of the transmitted light, that is, a resolution of the Fabry-Perot etalon filter.

Examples of constituent materials of the fixed substrate 410 and the movable substrate 420 include various glasses such as soda glass, crystalline glass, quartz glass, lead glass, potassium glass, borosilicate glass, and alkali-free glass, and quartz.

The fixed substrate 410 and the movable substrate 420 are bonded by the bonding film 414. The bonding film 414 is not particularly limited, and examples thereof include a plasma polymerization film containing siloxane as a main material.

Examples of the fixed reflection film 411 and the movable reflection film 421 include a metal film of such as Ag or an Ag alloy, and a dielectric multilayer film including a high refractive layer and a low refractive layer.

Examples of constituent materials of the fixed electrode 412 and the movable electrode 422 include various conductive materials.

The spectroscopic measurement unit 10 shown in FIG. 1 further includes a spectroscopic unit-side optical system 81 and an imaging element-side optical system 83.

The spectroscopic unit-side optical system 81 is disposed between the imaging target X and the spectroscopic unit 41. The spectroscopic unit-side optical system 81 shown in FIG. 1 includes an incident lens 811 and a projection lens 812 which serve as an incident optical system. The spectroscopic unit-side optical system 81 guides the reflected light reflected by the imaging target X to the spectroscopic unit 41.

The imaging element-side optical system 83 is disposed between the spectroscopic unit 41 and the imaging element 21. The imaging element-side optical system 83 shown in FIG. 1 includes an incident and emitting lens 831. The imaging element-side optical system 83 guides emission light emitted from the spectroscopic unit 41 to the imaging element 21.

By providing at least one of the spectroscopic unit-side optical system 81 and the imaging element-side optical system 83 in the spectroscopic measurement unit 10, it is possible to increase a light collection rate of the imaging element 21 collecting the reflected light reflected by the imaging target X.

At least one of the spectroscopic unit-side optical system 81 and the imaging element-side optical system 83 may be omitted according to the light collection rate of the imaging element 21.

The spectroscopic unit-side optical system 81 may be disposed between the spectroscopic unit 41 and imaging element-side optical system 83 in addition to the position shown in FIG. 1.

Although the spectroscopic measurement unit 10 has been described above, the position of the spectroscopic unit is not limited to the position shown in FIG. 1.

Specifically, in the spectroscopic measurement unit 10 shown in FIG. 1, although the spectroscopic unit 41 is disposed between the imaging target X and the imaging element 21, the spectroscopic unit 41 may be disposed between the imaging target X and the light source 31.

1.2. Display Unit

The display unit 15 displays an image obtained by visualizing the spectral image captured by the imaging element 21 and displays any other information. As the display unit 15, for example, a liquid crystal display element, an organic EL display element, or the like is used.

1.3. Input Unit

The input unit 16 receives input of data necessary for an operation of the control unit 60 from a user of the inspection device 1.

Examples of the input unit 16 include a touch panel, a slide pad, a keyboard, and a mouse. The input unit 16 may be combined with the display unit 15 and integrated with the display unit 15.

1.4. Storage Unit

The storage unit 17 stores various kinds of information such as programs and data necessary for the operation of each functional unit of the control unit 60, data acquired by the spectroscopic measurement unit 10, data necessary for the display of the display unit 15, and data input from the input unit 16.

A memory such as a random access memory (RAM) or a read only memory (ROM) is used as the storage unit 17.

1.5. Control Unit

The control unit 60 shown in FIG. 1 includes a light source control unit 601, a spectral control unit 602, an image generation unit 603, a display control unit 605, and a determination unit 610. The operation of each of the functional units is implemented by a combination of hardware such as a processor such as a central processing unit (CPU), a memory, and an external interface. For example, the control unit 60 reads and executes a program stored in the storage unit 17 to operate each functional unit and implement the function.

The light source control unit 601 controls turning on and off of the light source 31, a wavelength and intensity of the emission light, and the like based on information input to the input unit 16, information stored in the storage unit 17, and the like.

The spectral control unit 602 acquires, based on the information stored in the storage unit 17, a drive voltage corresponding to the specific wavelength region of the light emitted from the spectroscopic unit 41. Then, a control signal for applying the acquired drive voltage to the electrostatic actuator 45 of the spectroscopic unit 41 is output. Accordingly, the spectral control unit 602 can control the operation of the spectroscopic unit 41 so as to control the specific wavelength region of the light emitted from the spectroscopic unit 41.

The image generation unit 603 controls the operation of the spectroscopic measurement unit 10 and forms an image of light incident on the imaging element 21 via the spectroscopic unit 41. Then, a spectral image is generated based on imaging data obtained from the imaging element 21. The generated spectral image is stored in the storage unit 17. In the spectral image, a plurality of wavelengths are selected from the reflected light reflected by the imaging target X, and the spectral image includes a captured image at each wavelength. When the spectral image is stored in the storage unit 17, the image generation unit 603 also stores, in the storage unit 17, the specific wavelength region when the spectral image is generated.

The image generation unit 603 may store a visualized image obtained by visualizing the spectral image in the storage unit 17 together with the spectral image, or may display the visualized image on the display unit 15 as it is.

The display control unit 605 displays the spectral image, various kinds of information, and the like on the display unit 15 as the visualized image.

The determination unit 610 includes a division unit 611, a reference value determination unit 612, a spectrum generation unit 613, a color value calculation unit 614, a color difference calculation unit 615, and a determination unit 616.

As will be described in detail later, the division unit 611 divides the reference image Ps to generate a plurality of first divided regions, and divides the captured image Px, which is an image of the imaging target X, to generate a plurality of second divided regions.

The division unit 611 executes step S102 and step S202 described later.

In a second embodiment described later, the reference value determination unit 612 determines a reference value for obtaining a color difference between the first divided region and the second divided region.

The spectrum generation unit 613 generates a spectral spectrum of each pixel based on the spectral image of the imaging target X and the specific wavelength region that are stored in the storage unit 17. The spectral spectrum is a distribution of light intensity for each wavelength, and a spectral spectrum for each pixel can be generated based on the spectral image. Therefore, the spectrum generation unit 613 can also calculate the "entire spectrum" that is an average spectral spectrum of an entire measurement target area and the "region spectrum" that is an average spectral spectrum of each region generated by the division unit 611.

In the present embodiment, it is assumed that the spectral spectrum is a spectrum obtained by measuring the light intensity for four or more wavelength bands. Further, the spectral spectrum according to the present embodiment is preferably a spectrum obtained by measuring the light intensity for 16 or more wavelength bands.

The spectrum generation unit 613 may be configured to generate spectral information based on information directly obtained from the image generation unit 603 without using the storage unit 17. The generated spectral information is stored in the storage unit 17.

The spectrum generation unit 613 executes step S103 and step S203 described later.

For example, the color value calculation unit 614 calculates tristimulus values of each region based on the spectral spectrum, and further calculates a color value based on the obtained tristimulus values. The color value is a value representing a color of the entire measurement target area or a color of each region. The obtained color value is stored in the storage unit 17 together with information for specifying the entire measurement target area and information for identifying each region.

The color value calculation unit 614 executes step S104 and step S204, which will be described later.

The color difference calculation unit 615 calculates a color difference with the reference value based on the color value of each region obtained by the color value calculation unit 614. The color difference calculation unit 615 executes step S105 and step S205, which will be described later.

The determination unit 616 compares the color difference obtained by the color difference calculation unit 615 with a threshold value, and determines whether the color difference is within an allowable range. A determination result is stored in the storage unit 17 and displayed on the display unit 15 as necessary. The determination unit 616 executes step S106 and steps S206 to S212, which will be described later.

2. Inspection Method

Next, an example of the inspection method according to the disclosure will be described with reference to flowcharts shown in FIGS. 3 and 4.

The inspection method includes a first step S1 of acquiring reference image data DPs of the reference image Ps and performing various preparations, as shown in FIG. 3, and a second step S2 of performing inspection as shown in FIG. 4.

2.1. First Step S1

First, in step S101, the reference image data DPs of the reference image Ps is acquired. In this step, the reference image data DPs of the reference image Ps may be acquired by imaging the reference object using the spectroscopic measurement unit 10, the reference image data DPs of the reference image Ps input from the input unit 16 may be acquired, or the reference image data DPs of the reference image Ps stored in the storage unit 17 in advance may be read and acquired.

Next, in step S102, the numbers of vertical and horizontal divisions are specified. That is, it is determined how to divide the reference image Ps and set a first divided image. In the present embodiment, as shown in FIG. 5, a total of eight first divided regions of two rows and four columns are set. In the following description, four divided regions in an upper part of the drawing are referred to as a first divided region Ps1, a first divided region Ps2, a first divided region Ps1, and a first divided region Ps4 in an order from a left side of the drawing, and four divided regions in a lower part of the drawing are referred to as a first divided region Ps5, a first divided region Ps6, a first divided region Ps7, and a first divided region Ps8 in an order from the left side of the drawing.

Next, in step S103, a spectral image of each of the first divided region Ps1 to the first divided region Ps8 is measured, that is, a spectral spectrum is obtained. A sweep wavelength range of the spectral spectrum may be any wavelength range in the visible light region, for example, a wavelength range of 400 nm or more and 700 nm or less, or a wavelength range of 380 nm or more and 780 nm or less. The wavelength ranges may be settable by using the input unit 16, or may be set in advance. A measurement interval is not particularly limited, and may be, for example, 5 nm, 10 nm, or 20 nm. The measurement intervals may be settable by using the input unit 16, or may be set in advance.

Next, in step S104, color values of the first divided region Ps1 to the first divided region Ps8 are calculated. The color value mentioned here refers to an average color value of each of the first divided region Ps1 to the first divided region Ps8. Examples of a method of calculating the color value include a method of calculating the color value based on an overall XYZ value according to definition of a predetermined color space. Examples of the predetermined color space include an L*a*b*color system, an LCH color system, a Munsell color system, and a Yxy color system. When a non-light-emitting body such as a printed object or a fabric is an inspection target, it is preferable that the color value is obtained according to definition of a color space of the L*a*b*color system.

Next, in step S105, color differences ΔE of the first divided region Ps1 to the first divided region Ps8 are calculated, and calculation results are stored. In the present embodiment, the color difference ΔE refers to a difference with a color value of a reference color Cs. That is, a color difference ΔE of the first divided region Ps1 can be obtained by calculating a difference between the average color value of the first divided region Ps1 and the color value of the reference color Cs. Similarly, a color difference ΔE of the first divided region Ps2 can be obtained by calculating a difference between the average color value of the first divided region Ps2 and the color value of the reference color Cs. Similarly, a color difference ΔE of the first divided region Ps3 can be obtained by calculating a difference between the average color value of the first divided region Ps3 and the color value of the reference color Cs. Similarly, a color difference ΔE of the first divided region Ps4 can be obtained by calculating a difference between the average color value of the first divided region Ps4 and the color value of the reference color Cs. Similarly, a color difference ΔE of the first divided region Ps5 can be obtained by calculating a difference between the average color value of the first divided region Ps5 and the color value of the reference color Cs. Similarly, a color difference ΔE of the first divided region Ps6 can be obtained by calculating a difference between the average color value of the first divided region Ps6 and the color value of the reference color Cs.

A specific method of calculating the color difference is not particularly limited, and a method using a known color difference formula may be exemplified. Examples of the color difference formula include a CIE76 color difference formula (ΔE76), a CIE94 color difference formula (ΔE94), a CMC color difference formula (ΔEcmc), and a CIEDE2000 color difference formula (ΔE00).

Next, in step S106, waveform information of the color differences ΔE of the first divided region Ps1 to the first divided region Ps8, that is, a ΔE waveform is calculated and stored. As shown in FIG. 7, the ΔE waveform can be represented by a graph in which the color differences ΔE of the first divided region Ps1 to the first divided region Ps8 are plotted.

Through the first step S1 as described above, a preparation for the reference image data DPs of the reference image Ps is completed prior to the inspection. That is, the first step S1 is a first acquisition step of acquiring information in which information on the color difference with respect to the reference color Cs is assigned to each of the plurality of first divided regions Ps1 to Ps8 into which the reference image Ps is divided.

2.2. Second Step S2

First, in step S201, captured image data DPx of the captured image Px is acquired. In this step, the imaging target X is imaged using the spectroscopic measurement unit 10, and the captured image data DPx of the captured image Px is acquired. However, the disclosure is not limited to this configuration, and the captured image data DPx of the captured image Px input from the input unit 16 may be acquired, or the captured image data DPx of the captured image Px stored in the storage unit 17 in advance may be read and acquired.

In this step, when a position of the measurement target X in the captured image Px is deviated from a position of the measurement target X in the reference image Ps, processing such as trimming may be performed so as to arrange the measurement target X at the same position. The processing may be performed in advance.

Next, in step S202, the numbers of vertical and horizontal divisions are specified. That is, it is determined how to divide the captured image Px and set a second divided image. In this step, the number of divisions is the same as the number of divisions set in step S102 of the first step S1. Therefore, as shown in FIG. 8, a total of eight first divided regions of two rows and four columns are set. In the following description, four divided regions in an upper part of the drawing are referred to as a second divided region Px1, a second divided region Px2, a second divided region Px3, and a second divided region Px4 in an order from a left side of the drawing, and four divided regions in a lower part of the drawing are referred to as a second divided region Px5, a second divided region Px6, a second divided region Px7, and a second divided region Px8 in an order from the left side of the drawing.

Next, in step S203, a spectral image of each of the second divided region Px1 to the second divided region Px8 is measured, that is, a spectral spectrum is obtained. In this step, a spectral spectrum is obtained in a similar manner as in step S103 of the first step S1.

Next, in step S204, color values of the second divided region Px1 to the second divided region Px8 are calculated. The color value mentioned here refers to an average color value of each of the second divided region Px1 to the second divided region Px8. The calculation method is similar to that in step S103 of the first step S1.

Next, in step S205, color differences ΔE of the second divided region Px1 to the second divided region Px8 are calculated, and calculation results are stored. As shown in FIG. 9, a color difference ΔE of the second divided region Px1 can be obtained by calculating a difference between an average color value of the second divided region Px1 and the color value of the reference color Cs. Similarly, a color difference ΔE of the second divided region Px2 can be obtained by calculating a difference between an average color value of the second divided region Px2 and the color value of the reference color Cs. Similarly, a color difference ΔE of the second divided region Px3 can be obtained by calculating a difference between an average color value of the second divided region Px3 and the color value of the reference color Cs. Similarly, a color difference ΔE of the second divided region Px4 can be obtained by calculating a difference between an average color value of the second divided region Px4 and the color value of the reference color Cs. Similarly, a color difference ΔE of the second divided region Px5 can be obtained by calculating a difference between an average color value of the second divided region Px5 and the color value of the reference color Cs. Similarly, a color difference ΔE of the second divided region Px6 can be obtained by calculating a difference between an average color value of the second divided region Px6 and the color value of the reference color Cs.

A specific method of calculating the color difference is as described in the description of step S105.

Next, in step S206, waveform information of the color differences ΔE of the second divided region Px1 to the second divided region Px8, that is, a ΔE waveform is calculated and stored. As shown in FIG. 10, the ΔE waveform can be represented by a graph in which the color differences ΔE of the second divided region Px1 to the second divided region Px8 are plotted.

In this step, as shown in FIG. 11, captured image data DPx' of a captured image Px' obtained by rotating the captured image Px by 180° is created. That is, four divided regions in an upper part of the drawing are referred to as the second divided region Px8, the second divided region Px7, the second divided region Px6, and the second divided region Px5 in an order from a left side of the drawing, and four divided regions in a lower part of the drawing are referred to as the second divided region Px4, the second divided region Px3, the second divided region Px2, and the second divided region Px1 in an order from the left side of the drawing.

Then, as shown in FIG. 12, the color differences ΔE of the second divided region Px1 to the second divided region Px8 are calculated, and a ΔE waveform is calculated and stored. As shown in FIG. 13, the ΔE waveform can be represented by a graph in which the color differences ΔE of the second divided region Px8 to the second divided region Px1 are plotted in an order from a left side.

Steps S201 to S205 are a second acquisition step of acquiring information in which the information on the color difference with respect to the reference color Cs is assigned to each of the plurality of second divided regions Px1 to Px8 into which the captured image Px is divided.

Next, in step S207, the ΔE waveform shown in FIG. 7 and the ΔE waveform shown in FIG. 10 and calculated in step S206 are compared with each other, and it is determined whether the waveforms match each other. The determination in this step is made based on a preset threshold value using, for example, Mahalanobis distance determination. That is, the color differences ΔE of the first divided region Ps1 to the first divided region Ps8 and the color differences ΔE of the second divided region Px1 to the second divided region Px8 are compared in a predetermined combination, and it is determined whether deviation is equal to or less than a predetermined value.

The comparison in this step can be said to be performed in the following combination 1.

Combination 1:
(Information on Color Difference of First Divided Region Ps1 and Information on Color Difference of Second Divided Region Px1)
(Information on Color Difference of First Divided Region Ps2 and Information on Color Difference of Second Divided Region Px2)
(Information on Color Difference of First Divided Region Ps1 and Information on Color Difference of Second Divided Region Px3)
(Information on Color Difference of First Divided Region Ps4 and Information on Color Difference of Second Divided Region Px4)
(Information on Color Difference of First Divided Region Ps5 and Information on Color Difference of Second Divided Region Px5)
(Information on Color Difference of First Divided Region Ps6 and Information on Color Difference of Second Divided Region Px6)
(Information on Color Difference of First Divided Region Ps7 and Information on Color Difference of Second Divided Region Px7)
(Information on Color Difference of First Divided Region Ps8 and Information on Color Difference of Second Divided Region Px8)

Step S207 is a first comparison step of comparing information on the color differences of the first divided region Ps1 to the first divided region Ps8 with information on the color differences of the corresponding second divided region Px1 to the second divided region Px8. A comparison result in this step is a first comparison result.

In step S207, when it is determined that the waveforms match each other, the processing proceeds to step S209. On the other hand, when it is determined that the waveforms do not match each other in step S207, the ΔE waveform shown in FIG. 7 and the ΔE waveform shown in FIG. 13 and calculated in step S206 are compared with each other, and it is determined whether the waveforms match each other. The determination in this step is performed in a similar manner as in step S207. That is, the color differences ΔE of the first divided region Ps1 to the first divided region Ps8 and the color differences ΔE of the second divided region Px1 to the second divided region Px8 are compared in a predetermined combination, and it is determined whether deviation is equal to or less than a predetermined value.

The comparison in this step can be said to be performed in the following combination 2.

Combination 2:
(Information on Color Difference of First Divided Region Ps1 and Information on Color Difference of Second Divided Region Px8)
(Information on Color Difference of First Divided Region Ps2 and Information on Color Difference of Second Divided Region Px7)

(Information on Color Difference of First Divided Region Ps1 and Information on Color Difference of Second Divided Region Px6)
(Information on Color Difference of First Divided Region Ps4 and Information on Color Difference of Second Divided Region Px5)
(Information on Color Difference of First Divided Region Ps5 and Information on Color Difference of Second Divided Region Px4)
(Information on Color Difference of First Divided Region Ps6 and Information on Color Difference of Second Divided Region Px3)
(Information on Color Difference of First Divided Region Ps7 and Information on Color Difference of Second Divided Region Px2)
(Information on Color Difference of First Divided Region Ps8 and Information on Color Difference of Second Divided Region Px1)

Step S208 is a second comparison step of comparing the information on the color differences of the first divided region Ps1 to the first divided region Ps8 with the information on the color differences of the second divided region Px1 to the second divided region Px8 in a combination different from the combination in which the comparison is performed in step S207 which is the first comparison step. A comparison result in this step is a second comparison result.

When it is determined in step S208 that the waveforms do not match each other, it is considered in step S212 that the reference image data DPs and the captured image data DPx do not match each other. The determination result may be displayed on the display unit 15 as necessary. On the other hand, in step S208, when it is determined that the waveforms match each other, the processing proceeds to step S209.

By performing such steps S207 and S208, the following advantages can be obtained. For example, when the captured image Px is acquired in a state in which the captured image Px is rotated by 180°, and the captured image Px in a state of being rotated by 180° is compared with the reference image Ps, it may be determined that the captured image Px and the reference image Ps do not match each other although are to be determined to match each other. This is an adverse effect that the comparison is performed only once on an assumption that the captured image Px and the reference image Ps are oriented in the same direction as in the related art. On the other hand, in the disclosure, the comparison results in the first comparison step and the second comparison step described above can prevent erroneous determination as in the related art when it is determined whether the reference image data DPs and the captured image data DPx match each other, and it is possible to perform more accurate inspection.

Next, in step S209, color inspection is performed. That is, the color values of the reference image Ps and the captured image Px are compared with each other, and it is determined whether a degree of deviation is within the allowable range.

This step may be, for example, configured such that it is determined whether a difference between the average color value of the entire reference image Ps and the color value of the entire captured image Px is equal to or less than a threshold value, or configured such that the color values of the first divided region Ps1 to the first divided region Ps8 and the color values of the second divided region Px1 to the second divided region Px8 are compared in the combination 1 or the combination 2 described above, and it is determined whether a difference between the color values of the regions is equal to or less than the threshold value. In the latter case, the comparison is performed in a combination, in which the waveforms are determined to match each other in step S207 or step S208, in the combination 1 and the combination 2.

When it is determined in step S209 that the difference between the color value of the reference image Ps and the color value of the captured image Px is equal to or less than the threshold value, it is considered in step S211 that the reference image data DPs and the captured image data DPx match each other. The determination result may be displayed on the display unit 15 as necessary.

When it is determined in step S209 that the difference between the color value of the reference image Ps and the color value of the captured image Px exceeds the threshold value, it is determined in step S212 that the reference image data DPs and the captured image data DPx do not match each other.

Steps S209 and S210 may be omitted. Even when it is determined in step S209 that the difference between the color value of the reference image Ps and the color value of the captured image Px exceeds the threshold value, the processing may proceed to step S211 and it may be determined that the reference image data DPs and the captured image data DPx match each other. However, in this case, it is preferable to store a fact that the reference image data DPs and the captured image data DPx match each other, but the colors do not match each other.

By performing such a step S209, a case where the color values match each other can be regarded as matching, and more accurate inspection can be performed.

As described above, the inspection method according to this disclosure is an inspection method of inspecting whether the reference image data DPs of the reference image Ps the captured image data DPx of the captured image Px match each other, the inspection method includes: the first acquisition step of acquiring information in which the information on the color difference with respect to the reference color Cs is assigned to each of the plurality of first divided regions Ps1 to Ps8 into which the reference image Ps is divided; the second acquisition step of acquiring information in which the information on the color difference with respect to the reference color Cs is assigned to each of the plurality of second divided regions Px1 to Px8 into which the captured image is divided; the first comparison step of comparing the information on the color difference of each of the first divided regions Ps1 to Ps8 with the information on the color difference of each of the corresponding second divided regions Px1 to Px8; and the second comparison step of comparing the information on the color difference of each of the first divided regions Ps1 to Ps8 with the information on the color difference of each of the second divided regions Px1 to Px8 in a combination different from the combination in which the comparison is performed in the first comparison step, and whether the reference image data DPs and the captured image data DPx match each other is determined based on the first comparison result obtained in the first comparison step and the second comparison result obtained in the second comparison step. According to the disclosure, the following advantages can be obtained. For example, when the captured image Px is acquired in a state in which the captured image Px is rotated by 180°, and the captured image Px in a state of being rotated by 180° is compared with the reference image Ps, it may be determined that the captured image Px and the reference image Ps do not match each other although are to be determined to match each other. This is an adverse effect that the comparison is performed only once on an assumption that the captured image Px and the reference image Ps are oriented in the same direction as in the related art. On the other hand, in the disclosure, since it is determined whether the reference image data DPs and the captured image data DPx match each other based on the comparison results in the first comparison step and the second comparison step, it is possible to prevent erroneous determination as in the related art and it is possible to perform more accurate inspection.

The inspection device according to the disclosure includes: the control unit 60 that inspects whether the reference image data DPs of the reference image Ps and the captured image data DPx of the captured image Px match each other, and the control unit 60 executes the first acquisition step of acquiring information in which the information on the color difference with respect to the reference color Cs is assigned to each of the plurality of first divided regions Ps1 to Ps8 into which the reference image Ps is divided; the second acquisition step of acquiring information in which the information on the color difference with respect to the reference color Cs is assigned to each of the plurality of second divided regions Px1 to Px8 into which the captured image is divided; the first comparison step of comparing the information on the color difference of each of the first divided regions Ps1 to Ps8 with the information on the color difference of each of the corresponding second divided regions Px1 to Px8; and the second comparison step of comparing the information on the color difference of each of the first divided regions Ps1 to Ps8 with the information on the color difference of each of the second divided regions Px1 to Px8 in a combination different from the combination in which the comparison is performed in the first comparison step, and whether the reference image data DPs and the captured image data DPx match each other is determined based on the first comparison result obtained in the first comparison step and the second comparison result obtained in the second comparison step. According to the disclosure, as described above, it is possible to prevent erroneous determination as in the related art, and it is possible to perform more accurate inspection.

In the inspection method according to the disclosure, when a degree of deviation between the information on the color difference of each of the first divided regions Ps1 to Ps8 and the information on the color difference of each of the second divided regions Px1 to Px8 is equal to or less than a threshold value in one of the first comparison result and the second comparison result, it is determined that the reference image data DPs and the captured image data DPx match each other, and when the degree of deviation between the information on the color difference of each of the first divided regions Ps1 to Ps8 and the information on the color difference of each of the second divided regions Px1 to Px8 exceeds the threshold value in both of the first comparison result and the second comparison result, it is determined that the reference image data DPs and the captured image data DPx do not match each other. As a result, it is possible to more effectively prevent the erroneous determination as in the related art, and it is possible to perform more accurate inspection.

In the second comparison step, when images obtained by rotating the reference image Ps and the captured image Px relative to each other are superimposed on each other, information on the color difference between the first divided regions and the second divided regions which are superimposed on each other is compared. As a result, even if the captured image Px rotated by 180° is acquired, it is possible to more effectively prevent erroneous determination as in the related art.

As shown in FIGS. 7, 10, and 13, information on the color difference to be compared is waveform information indicating a relationship between the color differences and positions of the first divided regions Ps1 to Ps8 and the second divided regions Px1 to Px8. Accordingly, the first comparison step and the second comparison step can be executed by a simple method of comparing the waveform information.

In the present embodiment, the reference color Cs is a predetermined color. Thereby, the information on the color differences of the first divided regions Ps1 to Ps8 and the second divided regions Px1 to Px8 can be calculated by simple control.

As described in step S209 and step S210, it is determined whether the reference image data DPs and the captured image data DPx match each other in consideration of the color values of the first divided regions Ps1 to Ps8 and the second divided regions Px1 to Px8. As a result, a case where the color values of the first divided regions Ps1 to Ps8 and the second divided regions Px1 to Px8 match each other can be regarded as matching, and more accurate inspection can be performed.

Second Embodiment

Figure 14:
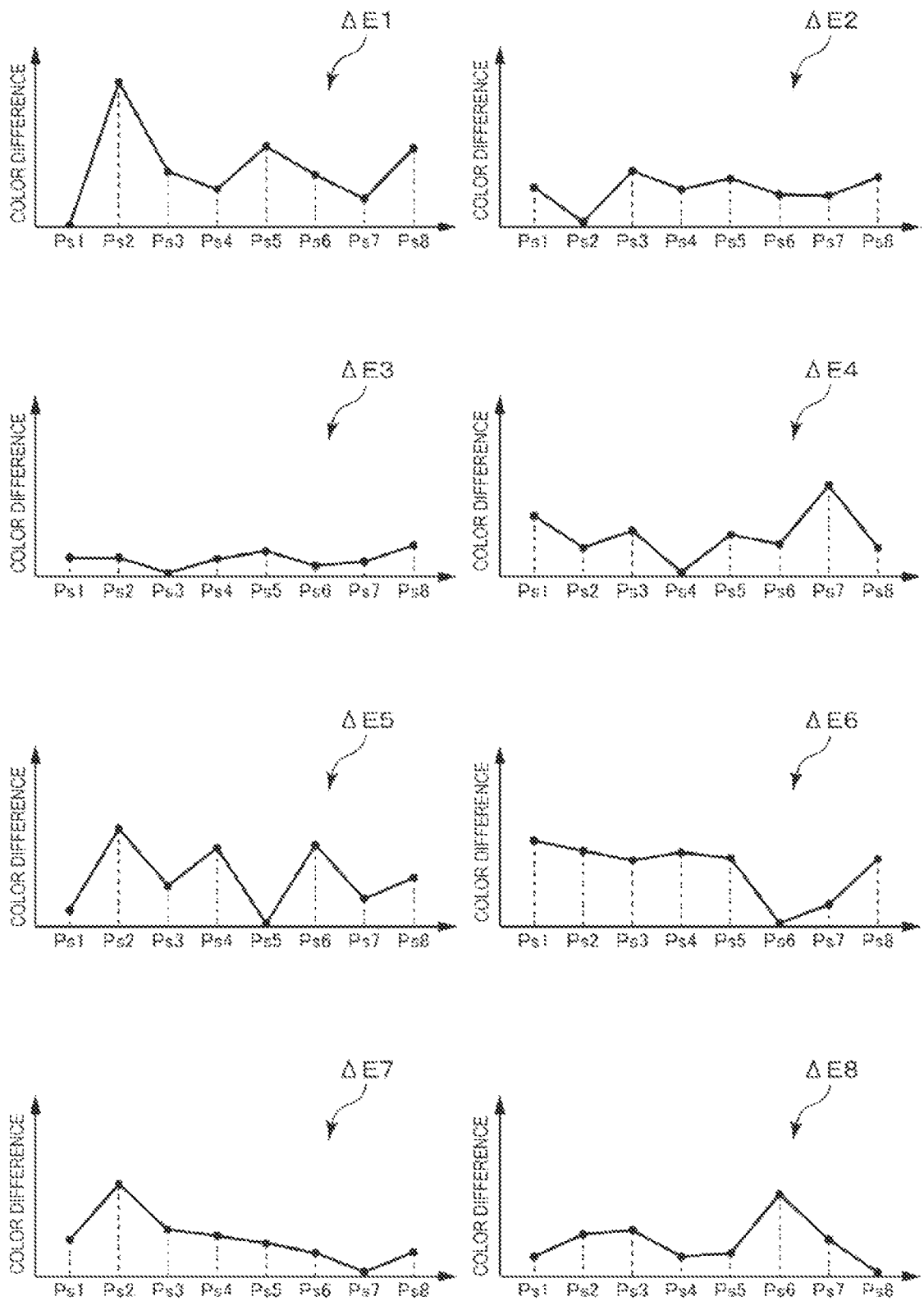
FIG. 14 shows graphs each showing a waveform indicating a color difference of each first divided region with reference to each first divided region in an inspection method according to a second embodiment of the disclosure.

FIG. 14 is a graph illustrating a method of determining a reference color in an inspection method according to a second embodiment of the disclosure.

Hereinafter, the second embodiment will be described, and in the following description, differences from the first embodiment will be mainly described, and description of similar matters will be omitted.

In the present embodiment, the method of determining the reference color Cs when the color difference is calculated in step S105 is different from that in the first embodiment. Therefore, only the method of determining the reference color Cs will be described.

Color differences of the first divided region Ps1 to the first divided region Ps8 are calculated by using an average color value of the first divided region Ps1 as a temporary reference color. The method of calculating the color difference is as described in the first embodiment. Then, by plotting the color differences $\Delta E$ of the first divided region Ps1 to the first divided region Ps8, a waveform $\Delta E1$ can be obtained as shown in FIG. 14.

Next, color differences of the first divided region Ps1 to the first divided region Ps8 are calculated by using an average color value of the first divided region Ps1 as a temporary reference color. Then, by plotting the color differences $\Delta E$ of the first divided region Ps1 to the first divided region Ps8, a waveform $\Delta E3$ can be obtained as shown in FIG. 14.

Next, color differences of the first divided region Ps1 to the first divided region Ps8 are calculated by using an average color value of the first divided region Ps4 as a temporary reference color. Then, by plotting the color differences $\Delta E$ of the first divided region Ps1 to the first divided region Ps8, a waveform $\Delta E4$ can be obtained as shown in FIG. 14.

Next, color differences of the first divided region Ps1 to the first divided region Ps8 are calculated by using an average color value of the first divided region Ps5 as a temporary reference color. Then, by plotting the color differences $\Delta E$ of the first divided region Ps1 to the first divided region Ps8, a waveform $\Delta E5$ can be obtained as shown in FIG. 14.

Next, color differences of the first divided region Ps1 to the first divided region Ps8 are calculated by using an average color value of the first divided region Ps6 as a temporary reference color. Then, by plotting the color differences ΔE of the first divided region Ps1 to the first divided region Ps8, a waveform ΔE6 can be obtained as shown in FIG. 14.

Next, color differences of the first divided region Ps1 to the first divided region Ps8 are calculated by using an average color value of the first divided region Ps7 as a temporary reference color. Then, by plotting the color differences ΔE of the first divided region Ps1 to the first divided region Ps8, a waveform ΔE7 can be obtained as shown in FIG. 14.

Next, color differences of the first divided region Ps1 to the first divided region Ps8 are calculated by using an average color value of the first divided region Ps8 as a temporary reference color. Then, by plotting the color differences ΔE of the first divided region Ps1 to the first divided region Ps8, a waveform ΔE8 can be obtained as shown in FIG. 14.

Then, among the waveforms ΔE1 to ΔE8, a waveform having a largest difference between a maximum color difference and a minimum color difference is selected. In the illustrated configuration, since the difference between the color difference of the first divided region Ps1 and the color difference of the first divided region Ps2 is the largest in the waveform ΔE1, the waveform ΔE1 is selected, the temporary reference color at that time, that is, the average color value of the first divided region Ps1 is set as the reference color Cs, and the waveform ΔE1 is used in subsequent steps.

According to such a method, since a waveform in which a characteristic of the waveform is most clearly shown is used when waveforms are compared with each other, it is possible to perform more accurate inspection.

As described above, in the present embodiment, the reference color Cs is an average color, that is, an average color value in one of the first divided region Ps1 to the first divided region Ps8. Accordingly, it is not necessary to separately set the reference color Cs in advance, and the control can be simplified.

In the present embodiment, the first divided region Ps1 to the first divided region Ps8 are sequentially selected one by one, and degrees of deviation between an average color in the selected first divided region and average colors in the first divided regions other than the selected first divided region are sequentially calculated, that is, the color differences are sequentially calculated, and a color of the first divided region in which a difference between the largest color difference and the smallest color difference is the largest is set as the reference color Cs. According to such a configuration, it is possible to set an optimal reference color Cs each time. Therefore, more accurate inspection can be performed.

The reference color Cs may be stored in advance, and then the control as in the present embodiment may be performed. That is, a color in a waveform in which a difference between a largest color difference and a smallest color difference is largest in the waveform shown in FIG. 7 and the eight waveforms shown in FIG. 14 may be selected.

Although the inspection method and the inspection device according to the disclosure have been described with reference to the illustrated embodiments, the disclosure is not limited thereto. Each step and each structure of the inspection method and the inspection device can be replaced with any step and structure capable of exhibiting similar functions. Any step or structure may be added. The disclosure may be a combination of features of the embodiments.

The first comparison step and the second comparison step may be performed in this order, may be performed in a reverse order, or may be performed at the same time.

Although in each of the embodiments described above, the configuration in which the waveforms of the color differences are compared with each other has been described, the disclosure is not limited thereto, and for example, a configuration in which the spectral spectra are further compared with each other may be adopted. In this case, the comparison can be performed by using a correlation coefficient between waveforms or a sum of squares of errors between waveforms.

Although in each of the above embodiments, the comparison is performed by rotating the captured image, the disclosure is not limited thereto, and the comparison may be performed by rotating the reference image. In this case, it is preferable to generate the reference image data obtained by rotating the reference image in advance.

Although in each of the above embodiments, the reference image and the captured image are rectangular, and the divided regions are set by eight divisions of two rows and four columns, the number of divisions and the division pattern in the disclosure are not limited thereto. In a case where the reference image and the captured image are square and the vertical and horizontal division ratios are the same, such as two rows and two columns, it is preferable to generate four images rotated by 90° each time and compare the four images with each other.

Although in each of the above embodiments, a configuration in which a spectroscopic unit is used to acquire the captured image has been described, the disclosure is not limited thereto, and a configuration in which an image captured by an imaging unit in which the spectroscopic unit is omitted is acquired may be adopted.

What is claimed is:

1. An inspection method of inspecting whether reference image data of a reference image and captured image data of a captured image match each other, the inspection method comprising:
    a first acquisition step of acquiring information in which information on a color difference with respect to a reference color is assigned to each of a plurality of first divided regions into which the reference image is divided;
    a second acquisition step of acquiring information in which information on a color difference with respect to the reference color is assigned to each of a plurality of second divided regions into which the captured image is divided;
    a first comparison step of comparing the information on the color difference of each of the first divided regions with the information on the color difference of each of the corresponding second divided regions; and
    a second comparison step of comparing the information on the color difference of each of the first divided regions with the information on the color difference of each of the second divided regions in a combination different from the combination in which the comparison is performed in the first comparison step, wherein
    whether the reference image data and the captured image data match each other is determined based on a first comparison result obtained in the first comparison step and a second comparison result obtained in the second comparison step.

2. The inspection method according to claim 1, wherein when a degree of deviation between the information on the color difference of each of the first divided regions and the information on the color difference of each of the second divided regions is equal to or less than a threshold value in one of the first comparison result and the second comparison result, it is determined that the reference image data and the captured image data match each other, and when the degree of deviation between the information on the color difference of each of the first divided regions and the information on the color difference of each of the second divided regions exceeds the threshold value in both the first comparison result and the second comparison result, it is determined that the reference image data and the captured image data do not match each other.

3. The inspection method according to claim 1, wherein in the second comparison step, when images obtained by rotating the reference image and the captured image relative to each other are superimposed on each other, information on the color difference between the first divided regions and the second divided regions which are superimposed on each other is compared.

4. The inspection method according to claim 1, wherein the information on the color difference is waveform information indicating a relationship between a color difference and positions of the first divided regions and the second divided regions.

5. The inspection method according to claim 1, wherein the reference color is a predetermined color.

6. The inspection method according to claim 1, wherein the reference color is an average color in one of the first divided regions.

7. The inspection method according to claim 6, wherein the first divided regions are sequentially selected one by one, degrees of deviation between an average color in the selected first divided region and average colors in the first divided regions other than the selected first divided region are sequentially calculated, and a color of the first divided region in which a difference between a largest degree of deviation and a smallest degree of deviation is largest is set as the reference color.

8. The inspection method according to claim 1, wherein the determination is performed in consideration of color values of the first divided regions and the second divided regions.

9. The inspection method according to claim 1, wherein the captured image is a spectral image captured by a spectral camera.

10. An inspection device comprising:

a control unit configured to inspect whether reference image data of a reference image and captured image data of a captured image match each other, wherein the control unit is configured to execute:

a first acquisition step of acquiring information in which information on a color difference with respect to a reference color is assigned to each of a plurality of first divided regions into which the reference image is divided, a second acquisition step of acquiring information in which information on a color difference with respect to the reference color is assigned to each of a plurality of second divided regions into which the captured image is divided, a first comparison step of comparing the information on the color difference of each of the first divided regions with the information on the color difference of each of the corresponding second divided regions, and a second comparison step of comparing the information on the color difference of each of the first divided regions with the information on the color difference of each of the second divided regions in a combination different from the combination in which the comparison is performed in the first comparison step, and whether the reference image data and the captured image data match each other is determined based on a first comparison result obtained in the first comparison step and a second comparison result obtained in the second comparison step.

\* \* \* \* \*